United States Patent [19]

Karian et al.

[11] 4,447,383

[45] May 8, 1984

[54] METHOD OF CENTRIFUGALLY PELLETIZING CERTAIN SYNTHETIC PLASTIC MATERIALS

[75] Inventors: Harutun G. Karian; David B. Todd, both of Saginaw, Mich.

[73] Assignee: Baker Perkins Inc., Saginaw, Mich.

[21] Appl. No.: 348,829

[22] Filed: Feb. 16, 1982

[51] Int. Cl.³ .............................................. B29C 6/00
[52] U.S. Cl. ......................................... 264/8; 264/142
[58] Field of Search ..................... 264/142, 8; 425/311, 425/142

[56] References Cited

U.S. PATENT DOCUMENTS 4,408,972  10/1983  Layfield ................................. 425/8
4,412,964   4/1983  Todd et al. ............................ 425/8

*Primary Examiner*—Jay H. Woo

*Attorney, Agent, or Firm*—Learman & McCulloch

[57] ABSTRACT

Uniform pellets of thermoplastic material are formed by centrifugally expressing strands of heated material from orifices on the rim of a hollow rotor and severing the strands with a linearly moving endless blade at a selected radial distance from the rim. The severed pellets pass in a tangential path through a cooling spray at the entrance to a pellet outlet duct. The severing blade is mounted on a bracket for movement to and from the severing position and for adjustment radially and circumferentially of the rotor axis. Two blade assemblies are employed alternately so that blade replacement may be accomplished without interrupting operation. Downstream from the outlet duct an auxiliary knifegate is employed adjacent a scrap duct and is movable from a severing position to a scrap duct closing position.

2 Claims, 8 Drawing Figures

METHOD OF CENTRIFUGALLY PELLETIZING CERTAIN SYNTHETIC PLASTIC MATERIALS

BACKGROUND OF THE INVENTION

The present invention is directed to methods and apparatus for forming pellets of thermoplastic materials such as polystyrene, polyethylene, polyvinylchloride, and polypropylene, among others. The pelletizing of such materials with incorporated additives is common because the pellets may be conveniently measured, packed, shipped, stored and used by the end user.

While many pelletizing systems find the thermoplastic material, in a flowable state, being expressed under pressure through orifices in a stationary die, as by a screw extruder, the useful efficiency (hydraulic power/total power supplied) of such systems is quite low.

To overcome the foregoing, and other problems associated with the stationary die type extrusion, centrifugal extruders have been developed in which thermoplastic material in a flowable state is fed into the interior of a hollow rotor to be centrifugally expressed through orifices in the rim of the rotor (see, for example, U.S. Pat. Nos. 3,358,323; 3,424,832; and 3,483,281).

The present invention is especially directed to improvements in pelletizers of the centrifugal type wherein the centrifugal head developed in the rotary polymer melt extruder is used to generate the pressure required for extrusion and the extruder is self-emptying. In such pelletizers there is no need to further heat the polymer because of insufficient pressure development (advantageous with thermally sensitive polymers) and an eddy current heating system can be efficiently and economically used to compensate for heat lost by the spinning rotor to the surroundings.

A prime object of the present invention is to provide certain novel improvements in methods of centrifugally pelletizing, and centrifugal pelletizing systems, which greatly enhance the practicality of such systems and will hereinafter be described in detail and claimed.

BRIEF SUMMARY

In accordance with the disclosure which follows, a hollow rotor having radially directed orifices in its peripheral rim portion is mounted for rotation within a housing about a horizontal axis. A sleeve projects coaxially from one side of the rotor outwardly through the adjacent side of the housing and a feed tube may be inserted, with clearance to provide for spillover relief, into the sleeve to feed thermoplastic material in a flowable state into the interior of the rotor. An endless strand severing device is mounted upon a bracket supported on the housing and includes an endless severing band trained about pulleys on the bracket. The bracket is positioned so that one of a pair of severing bands extends parallel to the rotor axis across the path of strands expressed from the rotor orifices to cut or sever pellets from the distal ends of the strands. The band is driven in continuous movement to equalize wear on the band and to maintain that portion of the band contacing the strands at relatively cool temperature.

Pellets severed by the band move from the severing location in a path tangential to the rotor into a receiving duct. A water spray arrangement is located at the entrance to the duct to cool the pellets entering the duct, thereby minimizing agglomeration of the pellets. The bracket carrying the severing band is mounted for both radial and circumferential adjustment relative to the rotor axis.

The shape and uniformity of the pellets is regulated by selecting the radial distance from the rotor rim at which the severing portion of the band engages the strands.

One of the prime objects of the invention is to provide an energy efficient system of the type described in which there is a control of air flow, coolant flow, and pellet trajectory to minimize heat losses.

A further object of the invention is to provide a system which operates with minimum operating energy consumption.

Other objects and features of the invention will become apparent by reference to the following specification and to the drawings.

IN THE DRAWINGS

Figure 1:
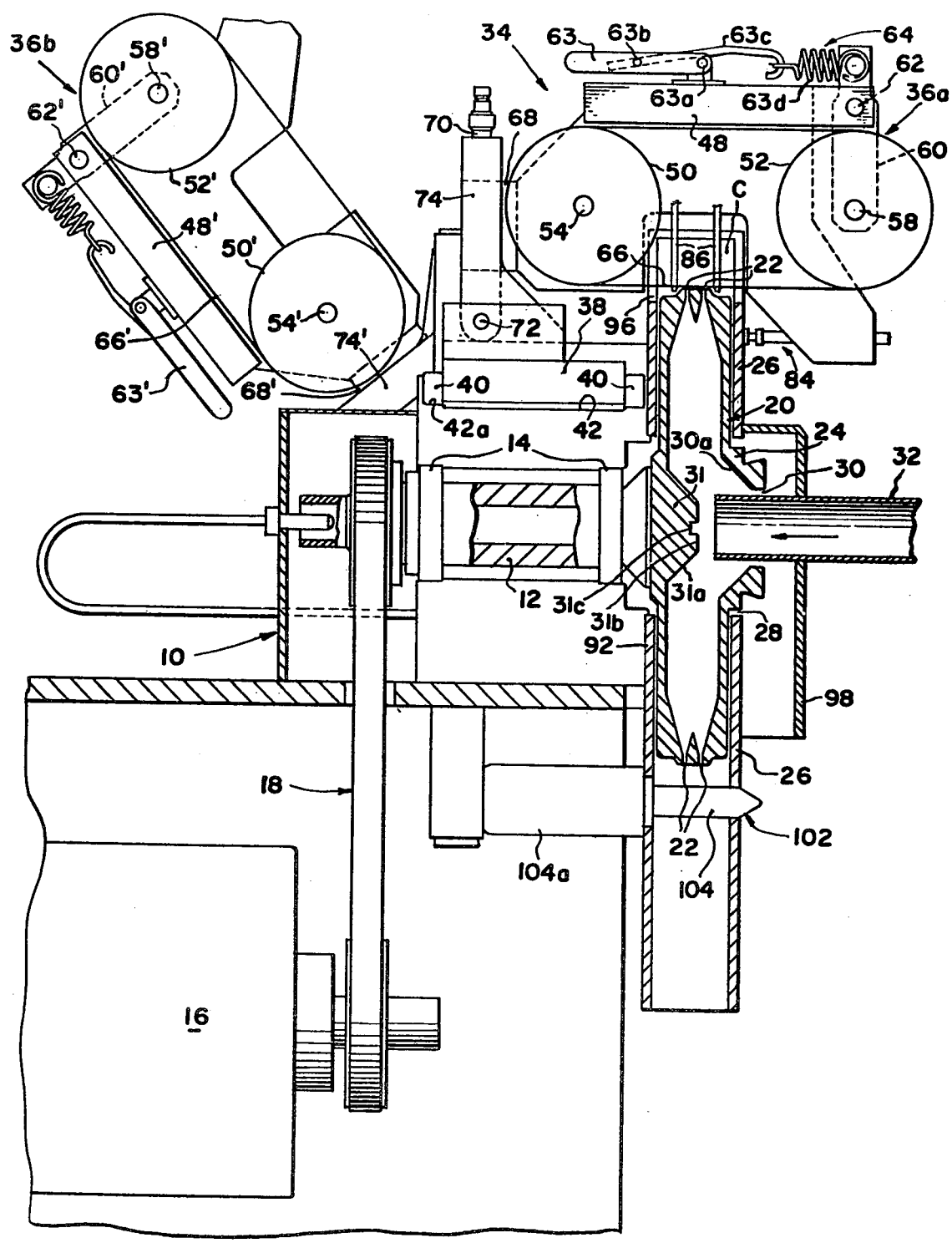
FIG. 1 is an end elevational view, with certain parts broken away, omitted, or shown in section, of a centrifugal pelletizer embodying the present invention.
Figure 2:
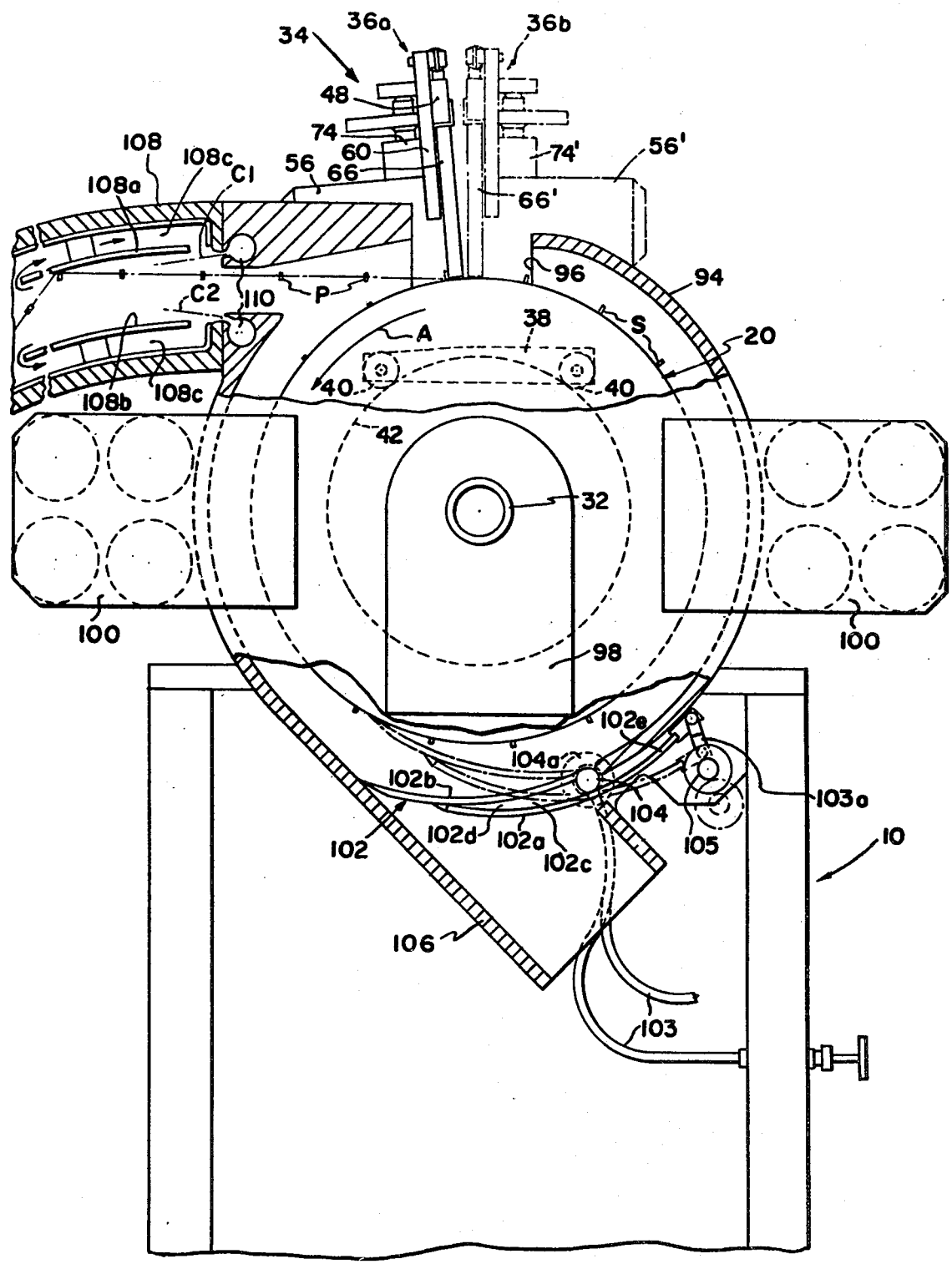
FIG. 2 is a side elevational view with certain parts broken away, omitted, or shown in section, of the pelletizer of FIG. 1.

Referring first particularly to FIGS. 1 and 2, a centrifugal pelletizer embodying the present invention includes a housing designated generally 10, within which a cooled rotor shaft 12 is rotatably supported, as by bearings 14. A drive motor 16 is mounted within the housing and is drivably coupled to drive rotor 12, as with a belt and pulley coupling designated generally 18.

A hollow rotor 20 is fixedly mounted upon one end of shaft 12 to rotate with the shaft and a plurality of radially directed strand expressing orifices 22 open from the interior of the rotor through the rotor rim. In the embodiment shown in FIG. 1, two rows of orifices 22 are shown.

At the side of the rotor opposite its coupling to shaft 12, a hollow sleeve 24 extends axially outwardly from the rotor beyond th adjacent side wall 26 of housing 10, sleeve 24 passing freely through an opening 28 in side wall 26. Rotor sleeve 24 is formed with a central opening 30 through which a stationary feed tube 32 may be inserted with clearance to feed thermoplastic material at a predetermined velocity (feed rate) into the hollow interior of rotor 20 opposite a pin-like diverter and impeller 31 having a flared annular surface 31a and a front face 31b broken by communicating slots 31c extending radially at 90° intervals to form impellers which help to accelerate the flow from the O r.p.m. at which is received from tube 32 to the speed of rotation of rotor 20. It is believed apparent that, upon rotation of rotor 20, thermoplastic material, heated to a flowable state and fed from feed tube 32 into the interior of rotor 20, will be directed and impelled radially and then centrifugally expressed from the interior of rotor 20 through orifices 22 so that strands S (FIGS. 6a and 6b) of thermoplastic material will be expressed radially outwardly from the rotor periphery. The strands are converted into pellets by a severing device, designated generally 34 and most clearly shown in FIGS. 3 and 4. A like annularly flared surface 30a on the rotor front wall leads to the space 30 which, by permitting overflow to exit from the housing wall 26, avoids a polymer overflow buildup between the rotor and housing which would both increase power consumption and tend to cause a jam-up to occur.

Figure 4:
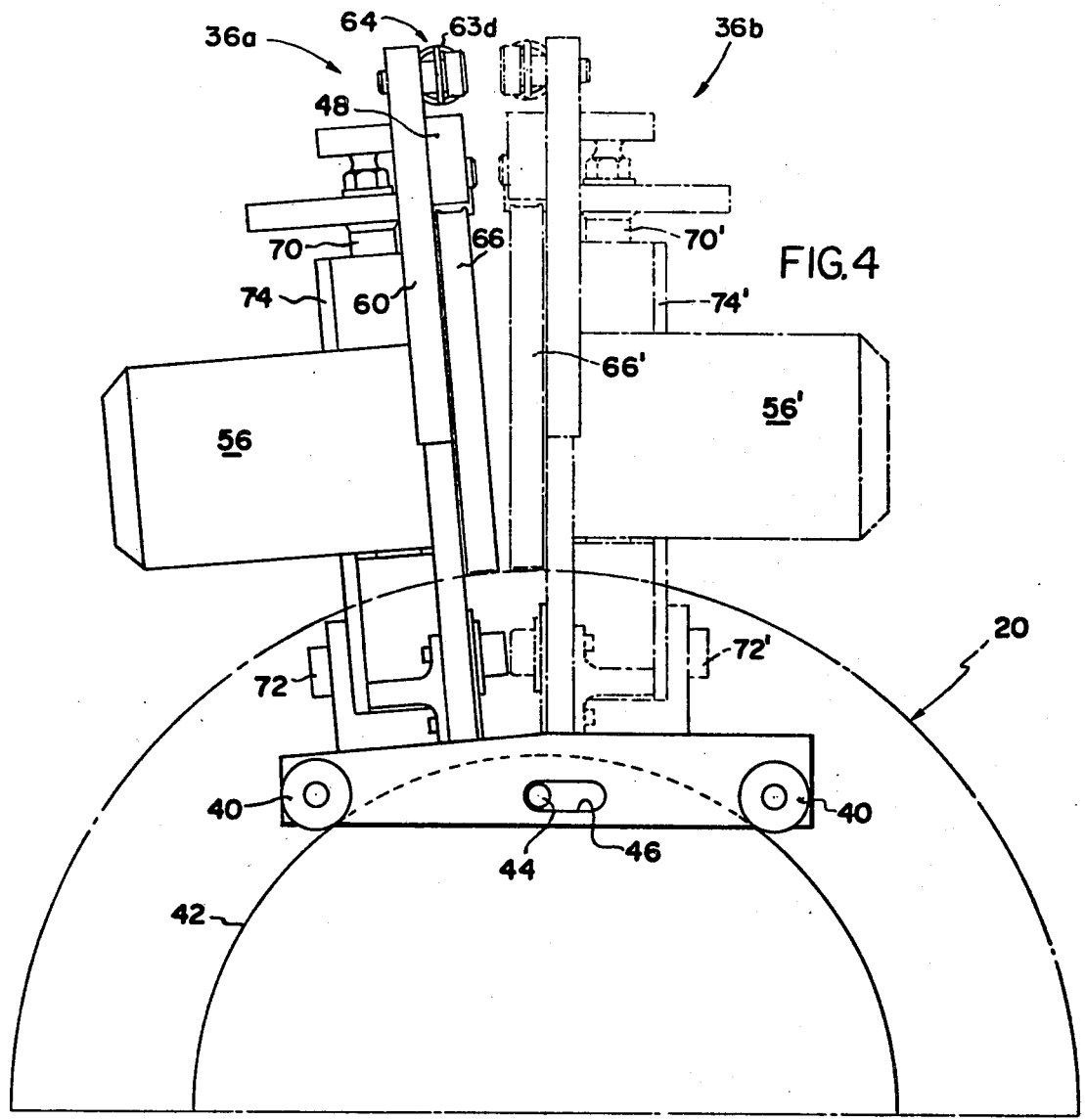
FIG. 4 is a detail side elevational view of the severing means illustrated in FIG. 3.

As best seen in FIG. 4, severing device 34 preferably includes two severing mechanisms designated generally 36a and 36b, which are identical except for being mirror image arrangements. The two mechanisms 36a and 36b are mounted upon a common carriage 38. Carriage 38 carries four support rollers 40 which support the carriage upon confined tracks 42a provided upon an axially extending annular shoulder 42 on housing 10 whose surface is coaxial with the rotor axis. A pin 44 fixedly mounted on housing 10 projects through a slot 46 in carriage 38 to define the end limits of circumferential movement of carriage 38 relative to the housing 10 which permit selective location of either severing device 36a, or severing device 36b, at a selected circumferential position relative to the rotor. Suitable set screw locking means 84, or the like, may be employed to releasably affix carriage 38 at the selected circumferential position.

As previously stated, severing devices 36a and 36b are of similar construction, thus only severing device 36a will be described in detail, it being understood the description is equally applicable to severing device 36b (primed numerals being used to designate like parts). Severing device 36a includes a main frame or bracket 48 upon which a pair of pulleys 50 and 52 are mounted. Pulley 50 is a driven pulley and is mounted upon the shaft 54 of a drive motor 56 whose housing is fixedly mounted upon bracket 48.

Figure 3:
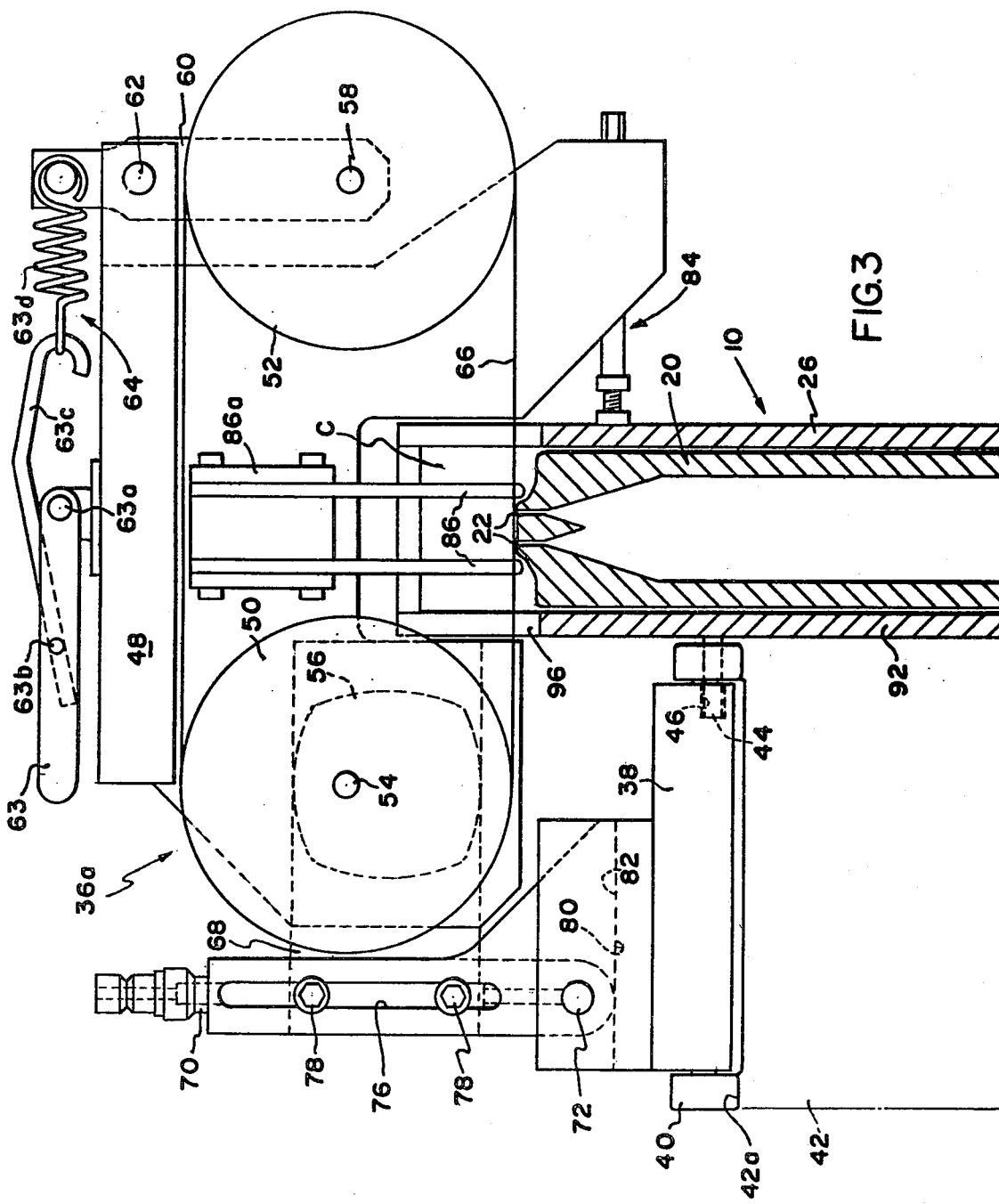
FIG. 3 is an enlarged detail end view, with certain parts shown in broken lines, more particularly illustrating the severing knife assembly.

Pulley 52 is mounted for free rotation about a pin 58 carried on the lower end of an arm 60 pivotally mounted upon bracket 48 as at 62. A spring tension device, designated generally 64, biases arm 60 in a counterclockwise direction about pivot 62 as viewed in FIG. 3 to apply tension to an endless severing band 66 (which may be constructed of thin spring steel in the range 0.1 to 0.5 mm in thickness), trained about pulleys 50 and 52. The device 64 includes a handle 63 pivoted at 63a and connected at 63b to an arm 63c which attaches to spring 63d, spring 63d securing at an opposite end to arm 60. As best seen in FIG. 3, the lower run of endless band 66 extends parallel to the axis of rotor 20 and is located to extend transversely across the path of movement of strands S expressed from the rotor orifices.

Bracket 48 may be bodily adjusted radially of the rotor axis to vary the spacing between the rotor rim and the lower or severing run of severing band 66. The adjustment is accomplished by structure which includes a mounting lug 68 at the left-hand end of bracket 48 as viewed in FIG. 3, which is threaded to receive an adjustment screw 70 whose lower end bears upon a pivot pin 72 mounted upon carriage 38. At either side of mounting lug 68, a pair of side plates 74 are pivotally mounted upon pin 72. Elongate slot 76 in each side plate 74 slidably receives a pair of locking screws 78 likewise threadably received in lug 68. With screws 78 loosened, rotation of screw 70 thus raises or lowers lug 68 relative to pivot 72, and the lug 68, and hence bracket 48 can be locked in a selected position of vertical adjustment by then tightening down the lock screws 78.

The pivot 72 serves as a pivotal mounting for the entire bracket 48 so that the bracket may be pivoted in a counterclockwise direction from the position shown in FIG. 3 to move severing band 66 of the severing device, clear of the path of movement of strands expressed by the rotor. By employing two severing devices 36a and 36b as shown in FIG. 4, one of the two devices 36a or 36b may be pivoted to an inoperative position so that its blade may be replaced, for example, while the other of the two severing devices is in its operative position. This arrangement enables blades to be replaced without requiring shut-down of the operation. Either cutter can be swung into position while the other is in operation, thereby permitting an interchange without interrupting polymer flow. The bracket 48 may be maintained in the operative position shown in FIG. 3 by the engagement between the lower surface 80 of side plates 74 with a flat surface 82 on carriage 38. However, it may be preferable to provide further support for the cantilevered end of the bracket 48 which is swung to the operative position by means of a spring biased snap clamp device designated generally 84 (FIG. 3).

Figure 5:
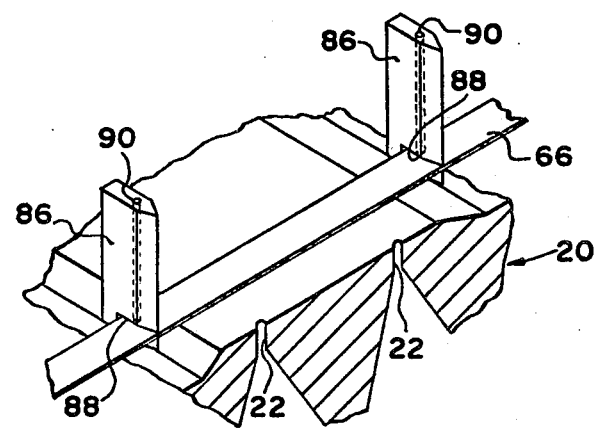
FIG. 5 is an enlarged detail perspective view showing blade support mechanism.

To assist in maintaining the operating portion of severing blade 66 in accurate alignment and to guard against twisting of the blade, blade guides 86 (FIG. 3) are fixedly mounted on bracket 48. The guides 86 are formed with blade-receiving slots 88 (best seen in FIG. 5) which slidably receive the blade to brace the blade against the impact it receives when it is contacted by the rapidly rotating strands and to maintain the blade against twisting. The guides 86 are located on opposite sides of the paths of movement of the set or sets of strands expressed from the embodiment of the rotor disclosed. In the case where rotors of greater axial thickness and greater numbers of sets of orifices are employed, additional blade guides are employed so that the unbraced portion of the blade would span no more than two sets of orifices.

While movement of the blade 66, by operation of motor 56, will normally provide for adequate cooling of the renewable flexible blade with many polymer melts by continuously changing the point of engagement between the blade and strands so that the blade is kept cool and sharp, additional blade cooling can be economically and efficiently provided by means of passages 90 in blade guides 86 (on blade guide holder 86a), which may be employed to supply coolant continuously to the top of the blade (remote from the die orifices 22 so as not to chill them). The blade guides 86 not only commence the quenching operation with some more difficult to handle polymers (thus increasing the polymer range which can be handled), but also reduce the unsupported blade span to minimize vibration.

Referring now particularly to FIGS. 1 and 2, it is seen that housing 10 includes rotor housing side plates 26 and 92, which are spaced from rotor 20 with but a slight axial clearance. As best seen in FIG. 2, however, the circumferential portion 94 of housing 10 is spaced a substantial distance from the periphery of rotor 20 to allow for a substantial radial growth and projection of strands from the rotor orifices and provide a chamber C between wall 94 and the rotor. The rotor housing is formed with an opening at 96 to permit movement of the bands 66 into and out of operative relationship with the rotor. Mounted on the outer side of rotor housing side wall 26 to receive and confine thermoplastic material which may flow through the clearance between rotor sleeve 24 and feed tube 32 upon over-filling of the rotor, is a spillover housing 98. The sleeve 24 thus prevents any over-flow from getting into the relatively confined space between the rotor and the adjacent side wall 26 of the housing. The lower end of spillover housing 98 is shown as open, but could be connected to a collection duct.

In order to make up heat loss which the closed construction keeps to a minimum and maintain the temperature of material within rotor 20, magnetic heaters such as 100 may be mounted upon the rotor housing to function in a manner similar to that described in U.S. Pat. No. 3,483,281.

On initial start-up of the device, some time is required to achieve steady state temperature and other operating conditions, and, during this period of time, material extruded from rotor 20 is diverted by means of a knife-gate 102, pivotally mounted upon the housing as at 104, see FIG. 2, adjacent a housing outlet in the form of a scrap chute 106. At this time, the band blade mechanisms 36a and 36b are both pivoted to up position, and it is knife-gate 102 which performs the strand severing function and diverts the material cut off to chute 106. During start-up, and shut down too, (the rotor is self-emptying of material at the end of a run), the material extruded from the rotor orifices is shaved off by pivoting diverter knife 102 into contact with the rotor periphery, so that the shaved-off strands are discharged through tube 106. The knife 102 is in the form of a hollow housing and includes walls 102a and 102b with closed ends 102c providing a chamber 102d to which a temperature controlling liquid (normally coolant) medium may be circulated via inlet and outlet hoses 103. Plate 102a has a trailing rear end 102e carried by an actuating handle device 103a which is manipulated to move the knife 102 to selected positions and releasably maintain them there. During normal operation, the gate 102 is pivoted to a position where it closes the entry to diverter chute 106 so no air (and therefore heat) is lost out this opening. In some instances, during operation, gate 102 may be pivoted to an intermediate position to divert very fine hair-like plastic material (known in the trade as "angel hair") which is in extruding operations formed and carried by the air current generated around to this point, to thus permit its removal out duct 106. The pin 104 which is fixed to gate 102 is journaled in a bearing 104a supported on the housing 10 and a readily releasable set or lock screw, or handle operated cam lock device, 105 can be used to secure the gate-knife 102 in selected position at or between the extreme positions illustrated in FIG. 2.

As described above, during operation, only one of the two severing devices 36a, 36b will be located in an operative position, with the severing run of its associated severing band 66 located at a selected radial distance from the rotor periphery to sever pellets from the radially projecting strands carried past the band by the rotating rotor 20. Pellets severed by the severing device continue in straight line motion in a path that is generally tangential to rotor 20 and pass into the entrance of a collecting duct 108 of retangular cross section affixed to housing 10. Coolant spray manifolds 110, have ports directing spray curtains $C_1$ and $C_2$ of water or another suitable medium into tube 108 (and away from rotor 20), along the false top 108a and false bottom 108b provided therein. These sprays and the resultant coolant which fills duct 108 a short distance downstream from the entrance of tube 108 quench the pellets to prevent or minimize agglomeration of the pellets. The air passages 108c formed between the false top 108a and the duct 108 and the false bottom 108b and the duct provide chambers for air induced into the duct by and with the coolant to disengage and flow in a reverse direction back to the mouth of duct 108. In this way additional air is prevented from being induced into the system by the air current inducing flow of the sprays $C_1$ and $C_2$ acting to pull other air into the duct 108.

Figure 6A:
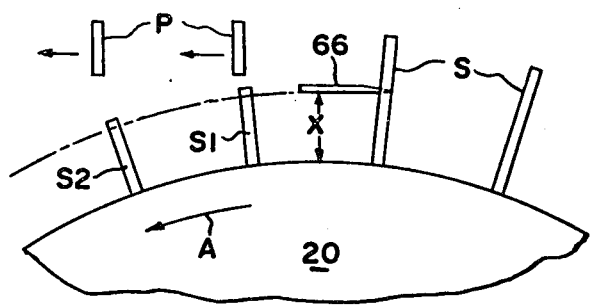
FIGS. 6a and 6b are schematic diagrams disclosing two types of severing operations.
Figure 6B:
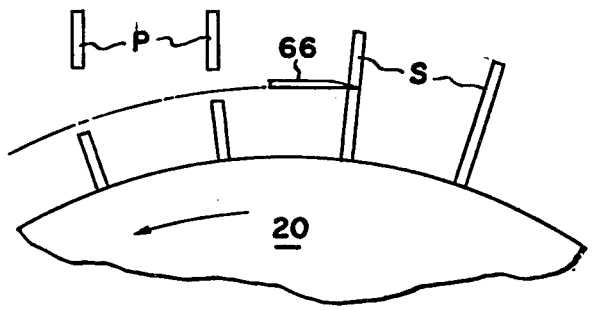

In FIGS. 6a and 6b two types of cutting action of the apparatus are schematically illustrated. The different cutting actions depend primarily upon the physical properties and characteristics of the material being handled.

In FIG. 6a, there is shown a schematic represenation of what might be termed the generalized theory of operation of the device. Rotor 20 is rotating in the direction indicated by arrow A, and cutter band 66 is positioned at a radial distance X from the rotor periphery. Cylindrical strands of thermoplastic material S expressed from the rotor orifices are carried by the rotation of rotor 20 successively into engagement with the severing blade 66 which severs a length of the material at the distal end of the strand S to form cylindrical pellets P, the severed pellets having sufficient momentum to continue to travel in straight line motion (tangentially) through the air currents in chamber C between rotor 20 and housing peripheral wall 94, on through the coolant curtain, and on into the pellet duct 108 (not shown in FIG. 6a). The peripheral positioning of the blade severing via platform carrier 38 is also important since the exact angle of trajectory is influenced by the angle of the cutting edge. With the cooled moving blade the pellets moreover, will uniformly fly off in a straight line (do not stick), more suited to quenching in the water spray curtain and pellet/water slurry formed in duct 108. The severed strands S1 and S2 of FIG. 6a immediately begin to grow or extend radially as the centrifugal force on the flowable thermoplastic material within rotor 20 continues to express material through the orifices so that, at the conclusion of one revolution, the strand S1 has radially grown to the length of the strand S as it again approaches severing blade 66. Where this generalized situation exists, pellet size may be maintained substantially uniform and controlled simply by appropriately selecting the blade spacing X with respect to steady state operation of the device.

However, experimental work has indicated that, in the case of highly visco-elastic polymers, such as low density polyethylene, pellet uniformity is not so simply achieved. Upon severing of the pellet, the removal of the mass of the pellet from the outer end of the strand causes the uncut portion of the strand to snap back, as indicated in FIG. 6b. The amount by which the visco-elastic material snaps back or foreshortens, upon the severing of a length from its distal end, is generally proportional to the mass of the material severed. Thus, a greater snap-back or retraction of the unsevered length of the strand will occur when a relatively long portion is severed from its distal end. The magnitude of the "snap-back" may be such that the strand does not grow back to its former length, during the next revolution to the severing blade. In this case, when the foreshortened strand arrives at the blade, a smaller length of material will be cut from its distal end by the blade and the "snap-back" will not be as great as in the previous case. Thus, during the next revolution, the strand will grown to a length greater than in the first case and again a longer length of strand will be severed. Thus, pellets of short and long lengths will alternately be severed on alternate successive revolutions of the rotor.

Figure 7:
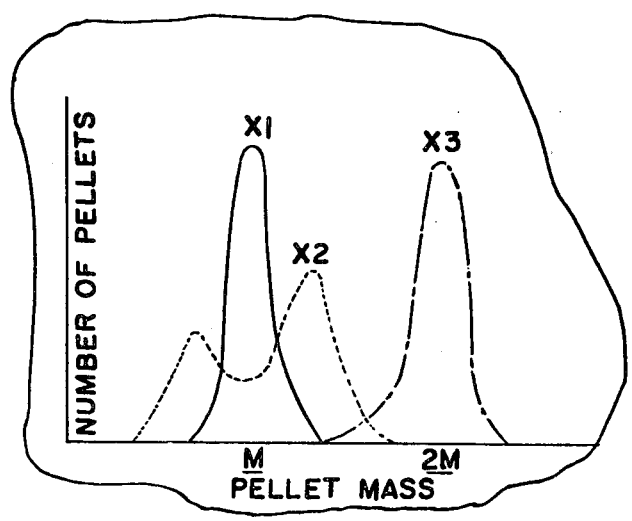
FIG. 7 is a graphic representation of pellet size distribution under certain operating conditions.

This phenomenon is illustrated graphically in FIG. 7 in which the size or mass distribution of pellets for three different knife spacings are plotted. The curve X1 represents a first knife spacing and shows a relatively narrow distribution of pellets which represents only a slight non-uniformity of pellet mass from a desired mass M.

Curve X2 shows the mass distribution which occurs at a slightly greater knife spacing X2 in which the phenomenon described above is evident. It will be noted that the mass distribution is much wider than in the case of knife spacing X1, and that the distribution curve has two separate peaks indicative of the severing of alternate short and long lengths from a given strand on successive revolutions because of the "snap-back" characteristic described above.

Curve X3 represents a situation in which the length of the strand which is severed causes a "snap-back" of the unsevered portion of the strand of a magnitude such that during the completed revolution after the severing, the strand does not grow to a length sufficient to engage the severing blade at the conclusion of that revolution. At this point, the distribution becomes narrow again, but the distribution curve peaks at a pellet mass which is twice that attained for a knife spacing represented by the curve X1. In this instance, a given strand is being cut only once for each two complete revolutions of the rotor.

Depending upon the visco-elastic properties of the material, it thus becomes possible to provide uniform small pellets, or uniform twice as large pellets, at the same feed rate, rotor speed and other operating conditions, merely by changing the knife position from a spacing X (which creates pellets X1), to a greater spacing which cuts the strand uniformly once each two revolutions (and creates pellets X3 of twice the mass). Selected bimodal distributions are also possible.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

We claim:

1. A method for forming pellets of thermoplastic material comprising: centrifugally expressing strands of a visco-elastic thermoplastic material in a flowable state from orifices in the rim portion of a rotating hollow rotor by rotating the rotor through successive revolutions, severing said strands at a selected distance from said rim to form pellets; and controlling the mass of the pellets by locating a single strand severing member to extend across the general plane of movement of the expressed strands at a distance from said rim portion such that the visco-elastic retraction of the strands upon the severing of pellets therefrom is such that said strands are engaged by said severing member only on alternate revolutions of said rotor.

2. The method of claim 1 wherein said severing member is located a radially spaced distance from said orifices such that the visco-elastic retraction of the strand masses protruding from the orifices when pellets are cut is such that the strands will grow radially to a length short of a length which could be cut on the revolution following cutting, and will grow radially on the next successive revolution so that the lengths cut off are substantially the same as cut off previously.

* * * * *